(12) United States Patent
Nootz et al.

(10) Patent No.: US 9,927,457 B2
(45) Date of Patent: Mar. 27, 2018

(54) SINGLE BEAM/DETECTOR OPTICAL REMOTE CROSS-FLOW SENSOR

(71) Applicants: Gero A Nootz, Monterey, CA (US); Fraser Dalgleish, Vero Beach, FL (US); William T Rhodes, Boca Raton, FL (US); Weilin Hou, Slidell, LA (US)

(72) Inventors: Gero A Nootz, Monterey, CA (US); Fraser Dalgleish, Vero Beach, FL (US); William T Rhodes, Boca Raton, FL (US); Weilin Hou, Slidell, LA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 181 days.

(21) Appl. No.: 14/466,131

(22) Filed: Aug. 22, 2014

(65) Prior Publication Data
US 2015/0052991 A1   Feb. 26, 2015

Related U.S. Application Data

(60) Provisional application No. 61/869,269, filed on Aug. 23, 2013.

(51) Int. Cl.
*G01P 13/02* (2006.01)
(52) U.S. Cl.
CPC .................................... *G01P 13/02* (2013.01)
(58) Field of Classification Search
CPC ............................. G01P 13/025; G01P 13/02

USPC .............. 73/170.01, 170.04, 170.29, 170.34; 702/3, 50, 2, 77, 14; 367/15, 131; 324/365

See application file for complete search history.

(56) References Cited

U.S. PATENT DOCUMENTS

| 5,865,871 | A | * | 2/1999 | Simundich | .............. G01F 1/661 |
| | | | | | 356/28 |
| 6,408,679 | B1 | * | 6/2002 | Kline-Schoder | ......... A61B 8/08 |
| | | | | | 73/19.03 |
| 2008/0012850 | A1 | * | 1/2008 | Keating, III | ....... H04N 13/0207 |
| | | | | | 345/419 |
| 2012/0078517 | A1 | * | 3/2012 | Bogucki | ................. G01S 17/88 |
| | | | | | 702/3 |

OTHER PUBLICATIONS

Hou et al., Bahamas Optical Turbulence Exercise (BOTEX): Preliminary Results, SPIE vol. 8372, Jun. 12, 2012.

* cited by examiner

*Primary Examiner* — Hezron E Williams
*Assistant Examiner* — Suman K Nath
(74) *Attorney, Agent, or Firm* — US Naval Research Laboratory; Scott G. Bell (57) ABSTRACT

System and method for remotely sensing the cross-flow orientation of a fluid (including a gaseous fluid) over an extended range. A Fourier transform of beam wander of a single beam can be used to determine the orientation of the flow field. Many applications depend upon accurate flow orientation data to provide correct information such as, for example, citing of turbines on wind farms and atmospheric/ocean weather prediction.

18 Claims, 7 Drawing Sheets
(2 of 7 Drawing Sheet(s) Filed in Color)

SINGLE BEAM/DETECTOR OPTICAL REMOTE CROSS-FLOW SENSOR

CROSS-REFERENCE TO RELATED APPLICATIONS

This Application is a non-provisional application claiming priority to provisional application 61/869,296 filed on Aug. 23, 2013, entitled SINGLE BEAM/DETECTOR OPTICAL REMOTE CROSS-FLOW SENSOR under 35 USC 119(e). The entire disclosure of the provisional application is incorporated herein by reference.

BACKGROUND

Methods and systems disclosed herein relate generally to measuring fluid or gas flow, and more particularly to sensing cross-flow orientation and speed of a fluid over an extended range.

The wind direction of the atmosphere is routinely monitored by remote sensing techniques such as Light Detection and Ranging (LIDAR) and Sonic Detection and Ranging (SODAR). The measurement principles usually employed are the Doppler shift in applications where the flow is in the direction of the detecting beam (Benedetti-Michelangeli et al., *Measurements of aerosol motion and wind velocity in the lower troposphere by doppler optical radar, J Atmos Sci* 29, 906-910 (1972)) and cross-correlation of the scintillation pattern in a crosswind geometry (T. Wang, G. R. Ochs, and R. S. Lawrence, *Wind measurements by the temporal cross-correlation of the optical scintillations, Appl Optics* 20, 4073-4081 (1981)).

Scintillometers are used for cross wind measurements over extended ranges. Most applications for this kind of measurement are found in meteorology, climate, and environmental sciences. Monitoring the flow (wind in case of the atmosphere) is important to understand the transport of heat, gases, nutrients, and other substances which affect the environment. Also the wind speed over airport runways is sometimes monitored remotely by dual large-aperture scintillometers (DLAS) or single large-aperture scintillometers (SLAS). Similar instruments are being used to survey the wind conditions at potential sites for wind farms. Cross-correlation of the scintillation between two beams is utilized to determine the flow direction (e.g. DLAS). SLAS on the other hand only provide information on the speed of the flow, but lack the ability to determine the flow direction.

What is needed is a method that relies on the beam wander (also referred to herein interchangeably as wander, beam deflection, or deflection) of a single laser beam, measured in two orthogonal directions, to infer the cross-flow direction of an optically active turbulent medium. What is further needed is a system for remotely sensing the cross-flow orientation of a fluid (including a gaseous fluid) over an extended range.

SUMMARY

The system and method of the present embodiment can remotely sense the cross-flow orientation of a fluid over an extended range. The cross-flow orientation of an optically active turbulent field can be determined by Fourier transforming the wander of a laser beam propagating in the turbulent field. The turbulent field can include any fluid.

In the present embodiment, the beam wander of a single beam is used to find the flow orientation by Fourier transforming the beam wander. A single position sensitive detector, for example, but not limited to, quadrant detector or tetra-lateral PSD can be used to record the beam wander. Here beam wander refers to the position of the beam centroid independent of the precise shape of the beam. This simplifies the measurement setup compared to dual laser scintillometer implementations which also need two detectors. Position sensitive detectors (PSD) can use, for example, photodiode surface resistance to provide position data (X or Y coordinate data).

The computer method of one embodiment for determining flow orientation in a turbulent fluid can include, but is not limited to including, projecting a light source through the turbulent fluid onto a position sensitive detector (PSD), monitoring, by a first special purpose computer, beam wander on the PSD over a pre-selected time period, calculating, by a second special purpose computer, Fourier transforms of the beam wander along different directions of the PSD, the Fourier transforms being related to Fourier amplitudes and Fourier frequencies, and determining, by a third special purpose computer, the flow orientation by selecting the directions for which the Fourier amplitudes reach a maximum at the highest of the Fourier frequencies. The turbulent fluid can optionally be, but is not limited to being an ocean and a planetary atmosphere. The light source can optionally be continuous or pulsing, and can optionally be, but is not limited to being, a laser, a point source, a natural source, for example the Sun or the moon, or a plain wave.

In another embodiment, the computer method for surveying wind for a wind farm plan can include, but is not limited to including, computing, by a first special purpose computer, flow orientation. Computing flow orientation can include, but is not limited to including, projecting a continuous wave light source through the wind onto a position sensitive detector (PSD), monitoring beam wander on the PSD over a pre-selected time period, calculating Fourier transforms of the beam wander along different directions of the PSD, the Fourier transforms being related to Fourier amplitudes and Fourier frequencies, and determining the flow orientation by selecting the directions for which the Fourier amplitudes reach a maximum at the highest of the Fourier frequencies. The method for surveying wind can further include incorporating the flow orientation into a wind farm siting model, and executing, by a second special purpose computer, the model to create the wind farm plan. The light source in this embodiment can also optionally be continuous or pulsed, and can be, but is not limited to being, a laser, a point source, a natural source, or a plain wave.

In yet another embodiment, the computer system for determining flow orientation in a turbulent fluid can include, but is not limited to including, a position sensitive detector (PSD), a light source projecting a light beam through the turbulent fluid onto the PSD, a monitor processor executing on a first special purpose computer monitoring beam wander on the PSD over a pre-selected time period, and a flow orientation processor executing on a second special purpose computer calculating Fourier transforms of the beam wander along different directions of the PSD, the Fourier transforms being related to Fourier amplitudes and Fourier frequencies, the flow orientation processor determining the flow orientation by selecting the directions for which the Fourier amplitudes reach a maximum at the highest of the Fourier frequencies. The turbulent fluids can be, for example, but not limited to, an ocean or a planetary atmosphere. As in other embodiments, the light source can be continuous or pulsing, and can be a laser, a point source, a natural source, or a plain wave, for example.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

DETAILED DESCRIPTION

The problems set forth above as well as further and other problems are solved by the present teachings. These solutions and other advantages are achieved by the various embodiments of the teachings described herein below. The system and method of the present embodiment automatically compute flow orientation from a single light source, for example, continuous or pulsing.

Figure 1:
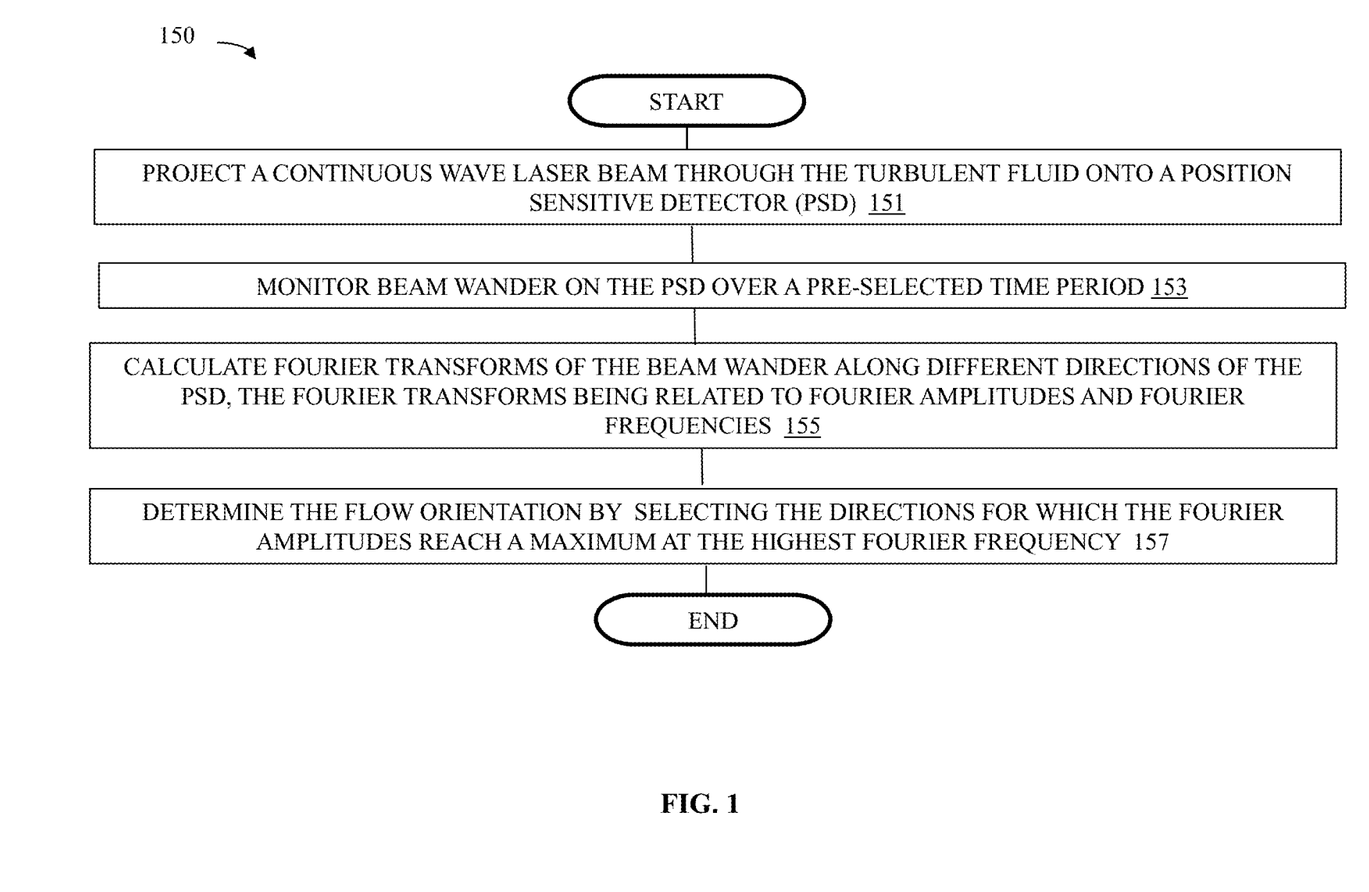
FIG. 1 is graphical display of the system of the present embodiment.

Referring now to FIG. 1, method 150 for determining flow orientation in a turbulent fluid can include, but is not limited to including, projecting 151 a light source through the turbulent fluid onto a position sensitive detector (PSD), monitoring 153 beam wander on the PSD over a pre-selected time period, calculating 155 Fourier transforms of the beam wander along different directions of the PSD, the Fourier transforms being related to Fourier amplitudes and Fourier frequencies; and determining 157 the flow orientation by selecting the directions for which the Fourier amplitudes reach a maximum at the highest of the Fourier frequencies.

Figure 2:
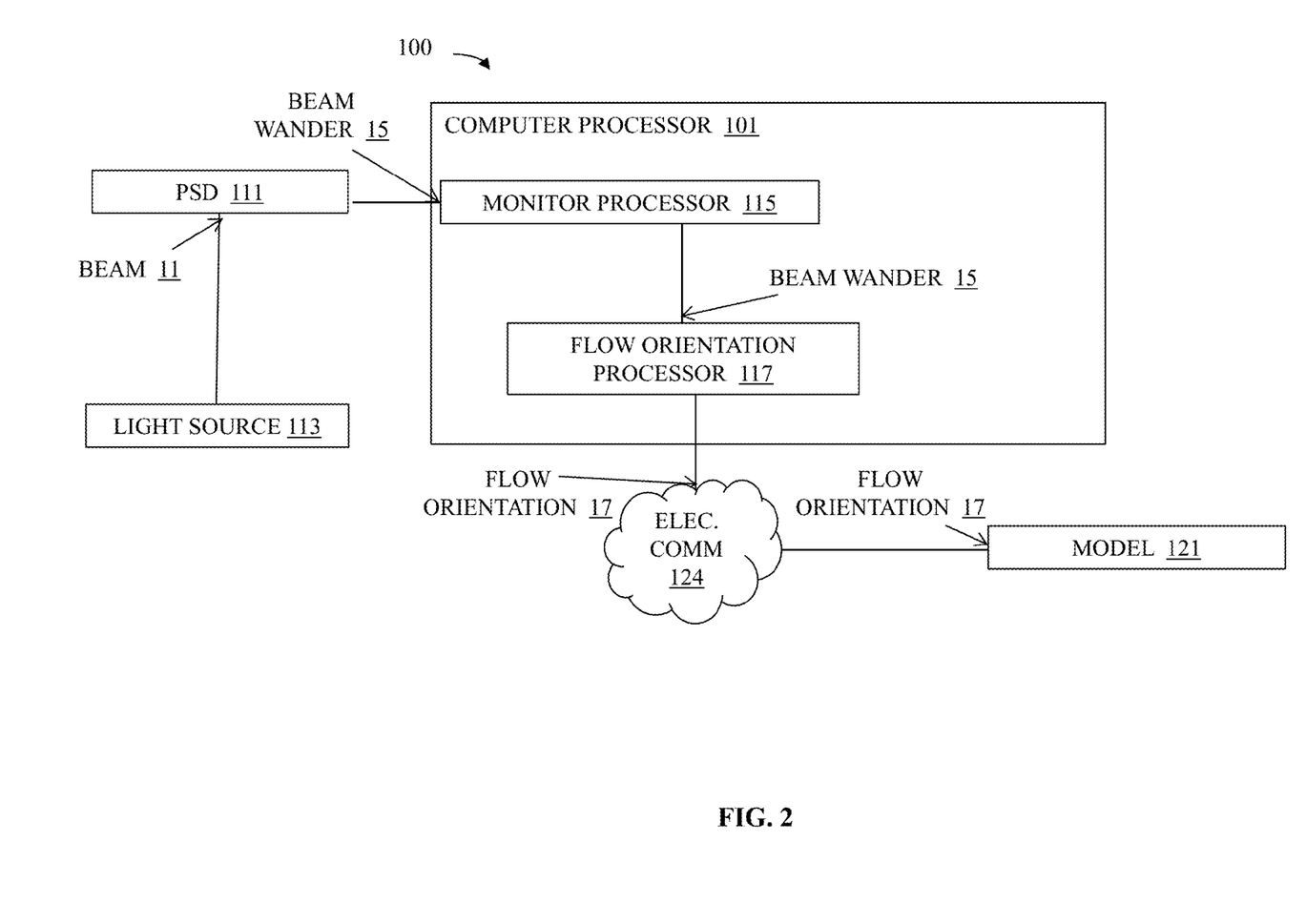
FIG. 2 is a flowchart of the method of the present embodiment.

Referring now to FIG. 2, system 100 for determining flow orientation in a turbulent fluid can include, but is not limited to including, position sensitive detector (PSD) 111, light source 113 projecting a light through the turbulent fluid onto the PSD, monitor processor 115 monitoring beam wander on the PSD over a pre-selected time period; and flow orientation processor 117 calculating Fourier transforms of the beam wander along different directions of the PSD, the Fourier transforms being related to Fourier amplitudes and Fourier frequencies, the flow orientation processor determining the flow orientation by selecting the directions for which the Fourier amplitudes reach a maximum at the highest of the Fourier frequencies.

Figure 3:
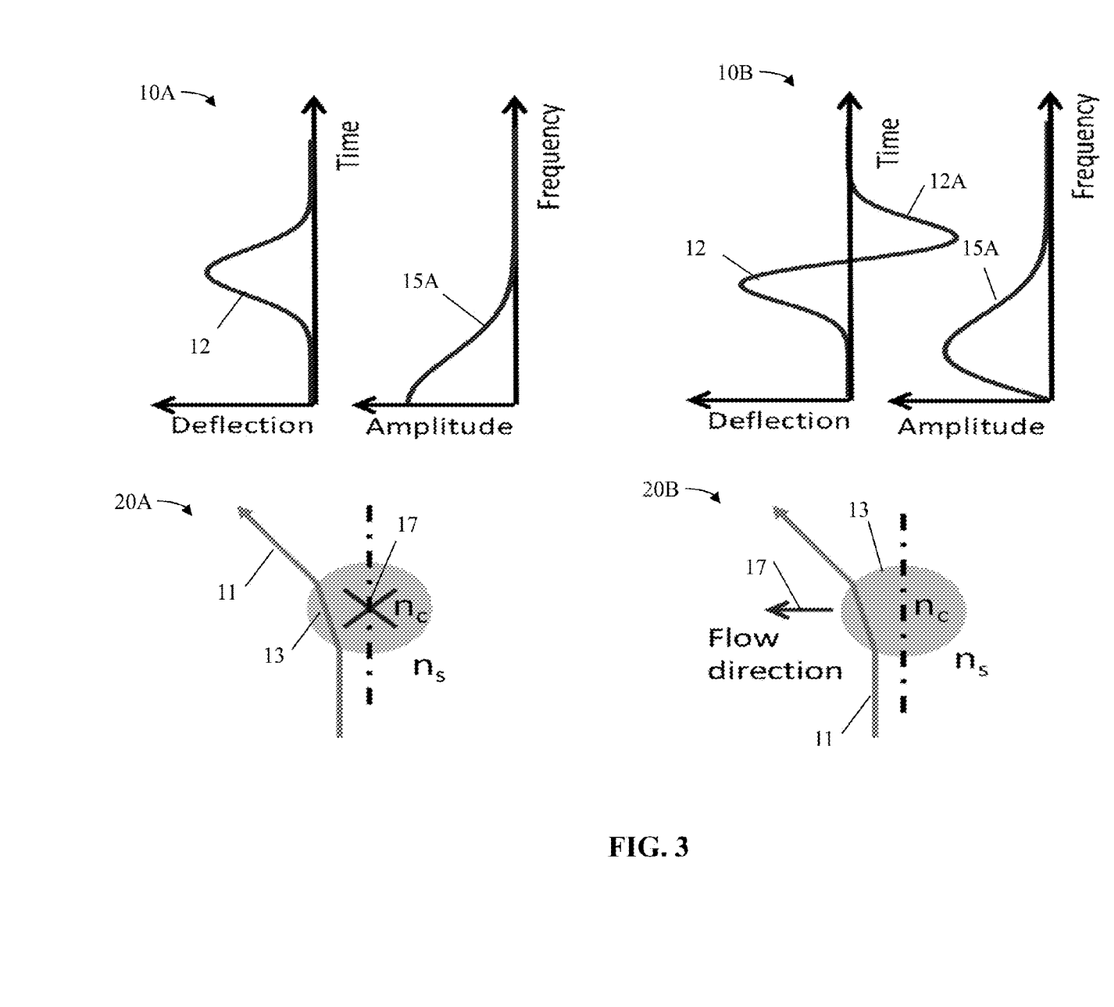
FIG. 3 is a pictorial representation of information about beam wander in the present embodiment.

Referring now to FIG. 3, diagram 20A illustrates beam deflection perpendicular to the flow caused by single turbulent cell 13 with cell index of refraction ($n_c$) smaller than the surrounding index of refraction ($n_s$) in which cell 13 is offset slightly to the right of beam 11 (flow orientation 17 into diagram 20A). Diagram 20B illustrates beam deflection parallel to flow orientation 17 for cell 13 entering beam 11 from the right and flowing to the left with flow orientation 17. Diagram 10A illustrates beam deflection 15 over time and amplitude 15A of the Fourier transform of beam wander represented by beam 11 in diagram 20A. Likewise, diagram 10B illustrates beam deflection 15 over time and amplitude 15A of the Fourier transform of beam wander of beam 11 in diagram 20B.

Continuing to refer to FIG. 3, beam deflection 15 perpendicular to flow 17 has the form of Gaussian-shaped hump 12 towards the left or the right, depending on the position of cell 13 relative to beam 11. Deflection 15 along flow orientation 17, however, traces the first derivative of a single Gaussian, i.e., hump 12A in the direction opposite to flow 17 followed immediately by hump 12 in flow orientation 17. For cells 13 of higher refractive index compared to its surrounding ($n_c > n_s$), deflections 15 occur in opposite directions. The magnitude of the Fourier transform, in accordance with the shift theorem (Eq. 1) (J. W. Goodman, *Introduction to Fourier optics*, Roberts & Co, (2005)), is invariant of translation in the time domain, and therefore is independent of the time cell 13 passes through beam 11:

$$|F(g(t-a))| = |F(g(t))e^{-i\omega a}| = |F(g(t))| \qquad (1)$$

For example, Fourier transforming the Gaussian-like signal for deflection perpendicular to the flow caused by a single turbulent cell will result in a Gaussian-like magnitude centered at zero frequency regardless of the time the cell transitions.

Furthermore, the Fourier transform of the derivative of any function is proportional to the Fourier transform of the function, multiplied by the frequency (Eq. 2). In the case of the derivative of a Gaussian, a Gaussian centered at the origin results are multiplied by its frequency variable:

$$\begin{aligned} F(g') &= \int_{-\infty}^{\infty} g'(t) e^{-i\omega t} dt \\ &= i\omega \int_{-\infty}^{\infty} g(t) e^{-i\omega t} dt \\ &= i\omega F(g) \end{aligned} \qquad (2)$$

Since the Fourier transform is a linear operator, the signals from a series of deflections will sum to either a Gaussian or a Gaussian multiplied by the frequency, independent of the time of the deflection. However, the randomly arriving pulses in the time domain will accumulate with random phases in the frequency domain. Therefore the signals from individual pulses interfere, which produces the fast varying, noise-like signal seen in the Fourier transform data.

Figure 4A:
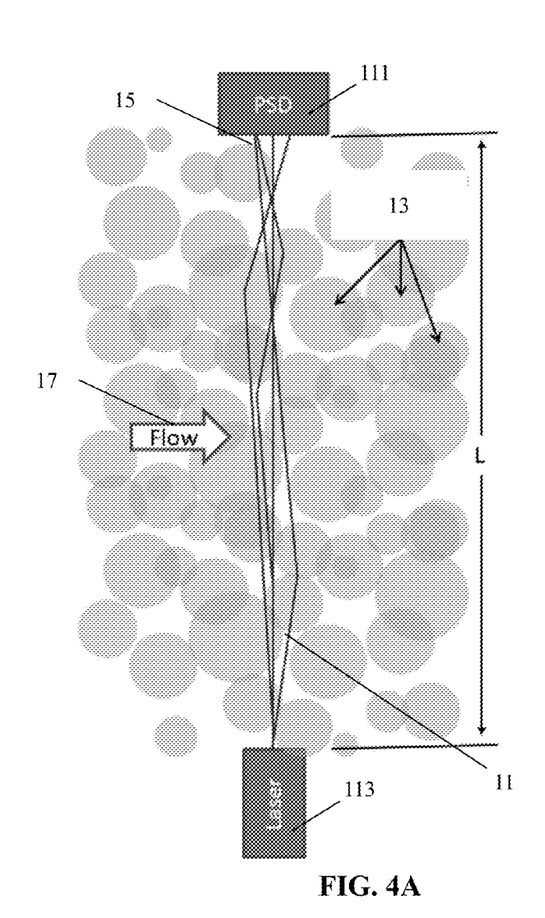
FIG. 4A is a pictorial representation of beam wander through a turbulent fluid.

Referring now to FIG. 4A, in order to illustrate the method of the present embodiment, the refractive index variations in an optically active turbulent field can be considered to come in the form of spherical cells 13 (D. A. Dewolf, *A random-motion model of fluctuations in a nearly transparent medium*, Radio Sci 18, 138-142 (1983)), that are considered to be static in shape on the relevant time scales (Taylor's frozen turbulence hypothesis (G. I. Taylor, *The spectrum of turbulence*, Proc R Soc Lon Ser-A 164, 0476-0490 (1938)). If a single such turbulent cell 13 transitions beam 11 whose diameter is small in comparison to cell 13, beam 11 will be deflected as a whole (beam wander) and will not undergo significant distortion (L. C. Andrews, R. L. Phillips, R. J. Sasiela, and R. R. Parenti, *Strehl ratio and scintillation theory for uplink Gaussian-beam waves: beam wander effects*, Opt Eng 45 (2006), L. C. Andrews and R. L. Phillips, *Laser beam propagation through random media*, SPIE Press (2005)). Beam deflection 15, caused by single cell 13 with an index of refraction smaller than its surrounding, moving in a plane perpendicular to beam 11 is considered. Deflection 15 along the axis parallel to flow orientation 17 will initially be in the direction of flow orientation 17 as cell 13 enters beam 11, and against flow orientation 17 as it exits beam 11. When cell 13 is exactly midway, there will be no deflection parallel to flow 17.

Figure 4B:
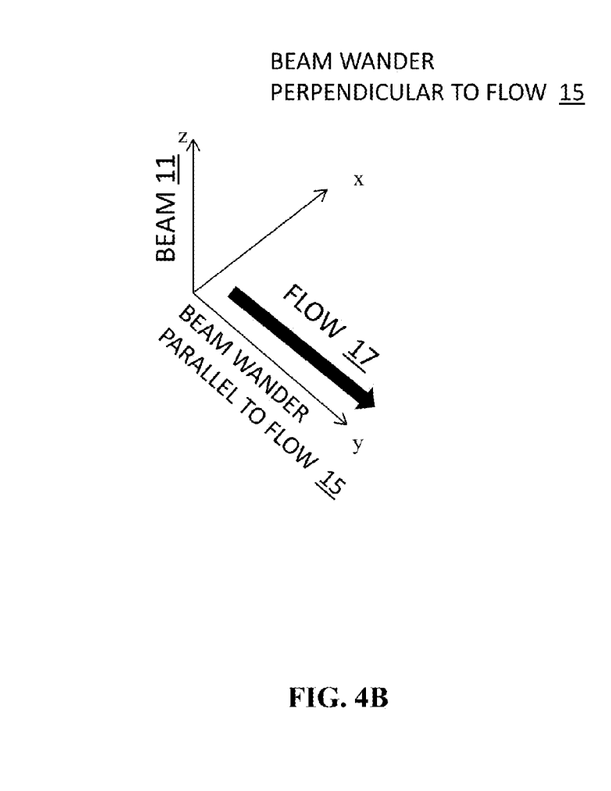
FIG. 4B is a graphical representation of the coordinate system in which beam wander is measured.

Referring to FIG. 4B, deflection 15 caused by cell 13 in the direction perpendicular to flow 17 will be to the right if cell 13 is displaced slightly to the left of beam 11, or to the left if cell 13 is displaced to the right of beam 11. No deflection perpendicular to flow 17 will be observed if cell 13 is centered on beam 11. In the example shown, if flow 17 is in the positive y-direction and beam 11 propagates along the positive z-direction, right and left refer to the directions along the positive and negative x-axis direction respectively, assuming a right handed coordinate system.

Figure 5:
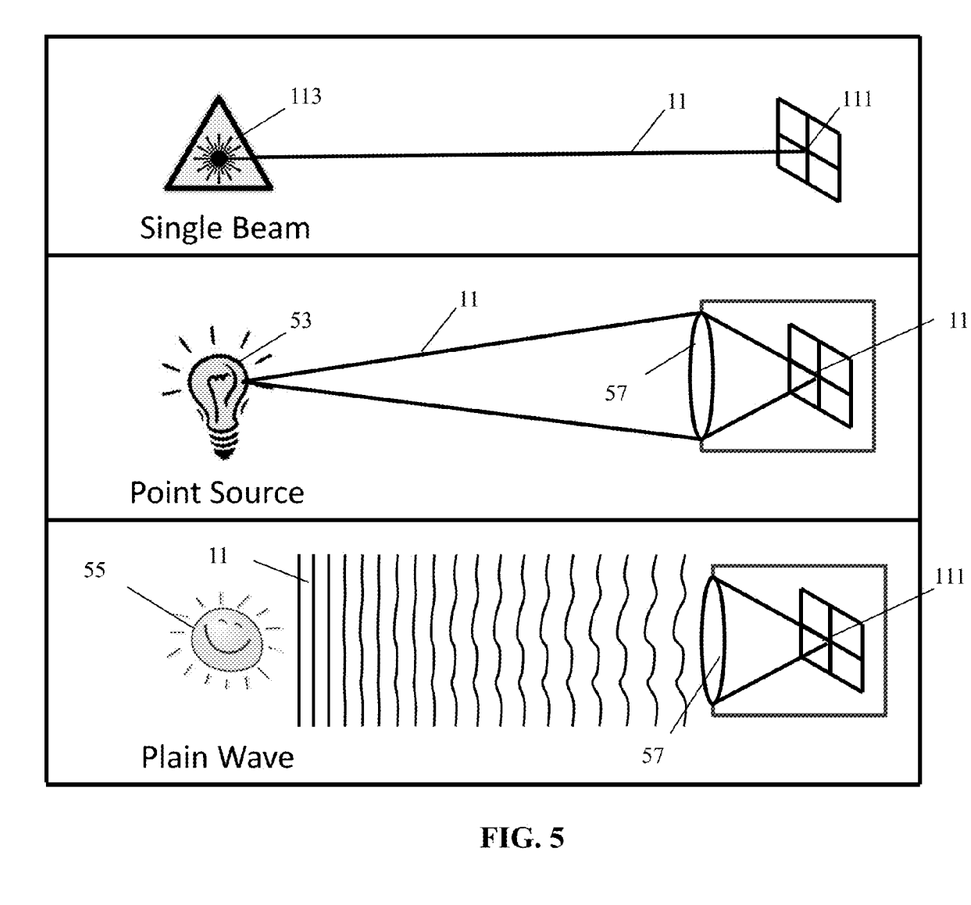
FIG. 5 is a pictorial representation of possible light sources.

Referring now to FIG. 5, light sources that could be part of system 100 (FIG. 2) are shown. Single beam source 113 can be received directly from PSD 111, whereas both point source 53 and plain wave 55 require lens 57 to concentrate beam 11 onto PSD 111.

Figure 6A:
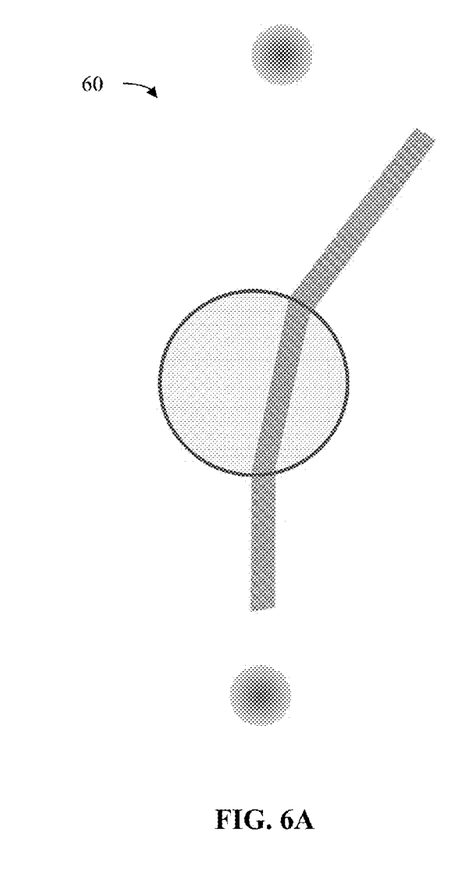
FIGS. 6A and 6B are pictorial representations contrasting beam wander with beam distortion.
Figure 6B:
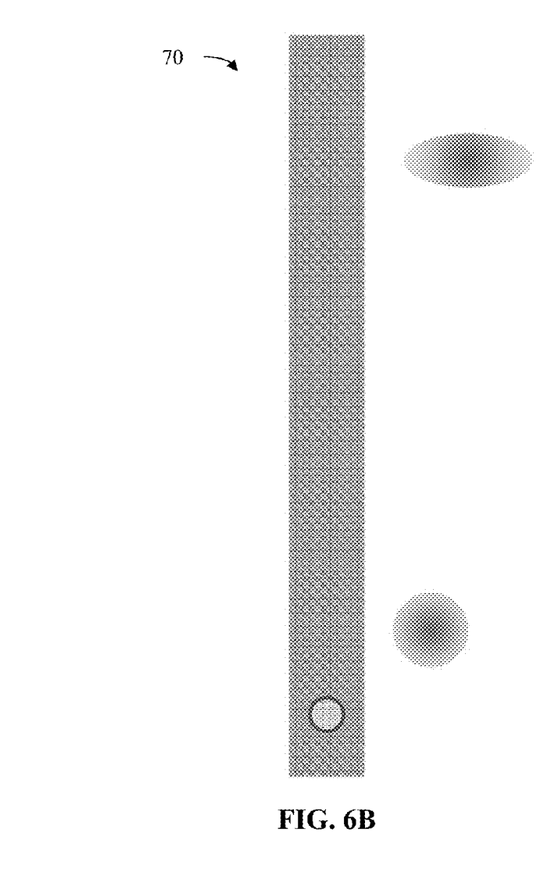

Referring now to FIGS. 6A and 6B, beam deflection result 60 is compared to beam distortion result 70. The system and method of the present embodiment rely on beam wander to compute flow orientation. If there is beam distortion, the centroid of the beam can be tracked. For example 2-D tetra-lateral PSD measurement accuracy and resolution are independent of the spot shape and size.

Figure 7A:
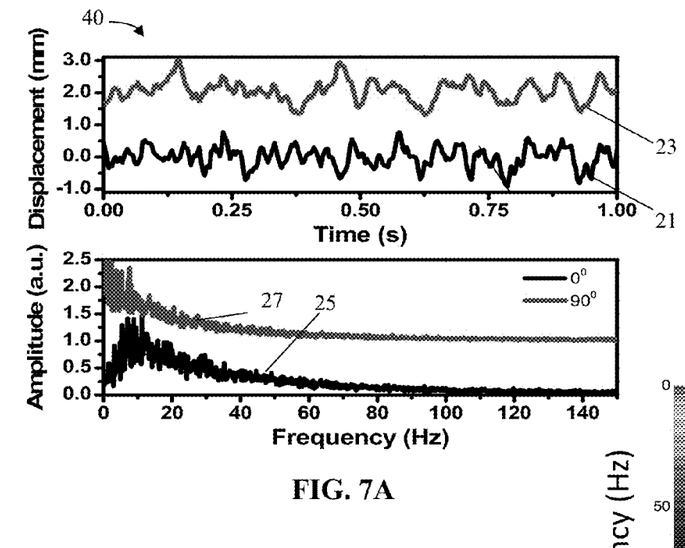
FIGS. 7A and 7B are graphical representations of the method of the present embodiment.
Figure 7B:
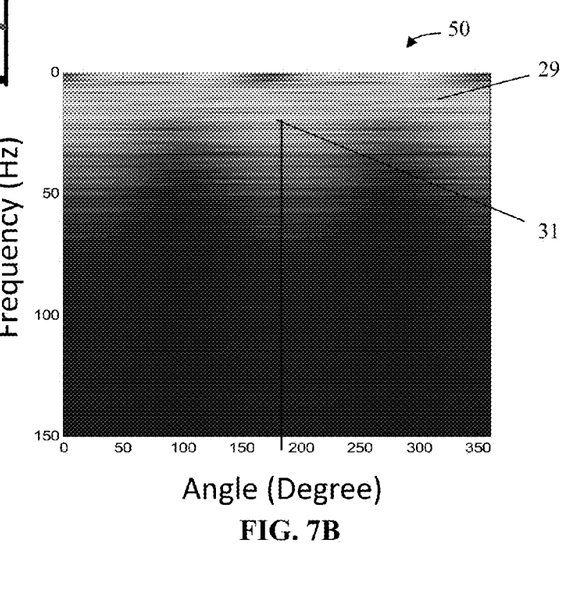

Referring now primarily to FIGS. 7A and 7B, field measurements 40 are shown. Red lines 23 represent beam deflection perpendicular to flow orientation 17 (FIG. 4B) and black lines 21 represent beam deflection parallel to the flow orientation 17 (FIG. 4B) of single beam 11 (FIG. 4B). Fourier amplitude 25 of beam 11 (FIG. 4B) parallel to the flow orientation 17 (FIG. 4B) and Fourier amplitude 27 of beams 11 (FIG. 4B) perpendicular to flow orientation 17 (FIG. 4B) are shown. Amplitude 29 of the Fourier transform calculated for angles from 0° to 360° with respect to PSD orientation is also shown. To compute flow orientation 17 (FIG. 4B), the Fourier transform giving the power spectral density 50 (i.e., Fourier amplitudes) can be computed for several, for example, but not limited to, forty to fifty, different directions and plotted as amplitude 29. Flow orientation 17 (FIG. 4B) can be derived from amplitude 29 by determining maximum 31 of the combined power spectral densities 50. The regions of high amplitude will form a sinusoidal shaped color band along the horizontal axis. There is a 180° ambiguity in the determination of flow orientation 17 (FIG. 4B) that comes from the plurality of maximum shift of the maxima of the Fourier amplitude 29 over 360°. Flow orientation 17 (FIG. 4B) is measured with respect to the x and y directions on PSD 111 (FIG. 4A). Beam 11 (FIG. 4B) is perpendicular to x and y of the PSD and therefore no information is extracted in the direction of beam 11 (FIG. 4B).

Embodiments of the present teachings are directed to computer systems such as system 100 (FIG. 2) for accomplishing the methods such as method 150 (FIG. 1) discussed in the description herein, and to computer readable media containing programs for accomplishing these methods. The raw data and results can be stored for future retrieval and processing, printed, displayed, transferred to another computer, and/or transferred elsewhere. Communications links such as electronic communications 124 (FIG. 2) can be wired or wireless, for example, using cellular communication systems, military communications systems, and satellite communications systems. In an exemplary embodiment, the software for the system is written in FORTRAN and C. The system can operate on a computer having a variable number of CPUs. Other alternative computer platforms can be used. The operating system can be, for example, but is not limited to, the LINUX® operating system.

The present teachings are also directed to software for accomplishing the methods discussed herein, and computer readable media storing software for accomplishing these methods. The various modules described herein can be accomplished on the same CPU, or can be accomplished on different computers. In compliance with the statute, the present embodiment has been described in language more or less specific as to structural and methodical features. It is to be understood, however, that the present embodiment is not limited to the specific features shown and described, since the means herein disclosed comprise forms of putting the present teachings into effect.

Methods such as method 150 (FIG. 1) of the present teachings can be, in whole or in part, implemented electronically. Signals representing actions taken by elements of the system and other disclosed embodiments can travel over at least one live communications network 124 (FIG. 2). Control and data information can be electronically executed and stored on at least one computer-readable medium. System 100 (FIG. 2) can be implemented to execute on at least one computer node in at least one live communications network 124 (FIG. 2). Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. A method for determining flow orientation in a turbulent fluid comprising:

projecting a light beam from a single beam light source through the turbulent fluid onto a position sensitive detector (PSD);

detecting, by a computer processor, beam wander as a centroid of the light beam on the PSD over a preselected time period from a plurality of different angles;

calculating, by the computer processor, Fourier transforms of the beam wander for the plurality of different angles on the PSD;

combining the Fourier transforms of the plurality of different angles to generate combined Fourier amplitudes, wherein regions of high Fourier amplitude in the combined Fourier amplitudes form a sinusoidal shaped Fourier amplitude band along an axis representing the plurality of different angles on the PSD;

determining, by the computer processor, a maximum Fourier amplitude along the sinusoidal shaped Fourier amplitude band that is at highest Fourier frequencies, wherein a selected angle of the plurality of different angles is associated with the maximum Fourier amplitude; and using the selected angle of the plurality of different angles to generate a flow prediction.

2. The method as in claim 1 wherein the turbulent fluid is an ocean and the flow prediction is an ocean forecast.

3. The method as in claim 1 wherein the turbulent fluid is a planetary atmosphere and the flow prediction is a weather forecast.

4. The method as in claim 1 wherein the single beam light source is continuous.

5. The method as in claim 1 wherein the single beam light source is pulsing.

6. The method as in claim 1 wherein the single beam light source is a laser.

7. The method as in claim 1 wherein the single beam light source is a point source.

8. The method as in claim 1 wherein the single beam light source is a plain wave.

9. A computer system for determining flow orientation in a turbulent fluid comprising:
    a position sensitive detector (PSD);
    a single beam light source projecting a light beam through the turbulent fluid onto the PSD;
    a monitor processor detecting beam wander as a centroid of the light beam on the PSD over a pre-selected time period from a plurality of different angles; and
    a flow orientation processor:
        calculating Fourier transforms of the beam wander for the plurality of different angles on the PSD;
        combining the Fourier transforms of the plurality of different angles to generate combined Fourier amplitudes that are plotted as Fourier amplitudes, wherein regions of high Fourier amplitude in the combined Fourier amplitudes form a sinusoidal shaped Fourier amplitude band along an axis representing the plurality of different angles on the PSD;
        determining a maximum Fourier amplitude along the sinusoidal shaped Fourier amplitude band that is at highest Fourier frequencies, wherein a selected angle of the plurality of different angles is associated with the maximum Fourier amplitude; and
        using the selected angle of the plurality of different angles to generate a flow prediction.

10. The system as in claim 9 wherein the single beam light source is a continuous wave.

11. The system as in claim 9 wherein the single beam light source is pulsing.

12. The system as in claim 9 wherein the single beam light source is a laser.

13. The system as in claim 9 wherein the single beam light source is a point source.

14. A non-transitory computer readable medium having computer-executable program instructions embodied therein for determining flow orientation in a turbulent fluid model, the computer-executable program instructions when executed causing a computer processor to:
    project a light beam from a single beam light source through the turbulent fluid onto a position sensitive detector (PSD);
    detect beam wander as a centroid of the light beam on the PSD over a pre-selected time period from a plurality of different angles;
    calculate Fourier transforms of the beam wander for the plurality of different angles on the PSD;
    combine the Fourier transforms of the plurality of different angles to generate combined Fourier amplitudes that are plotted as Fourier amplitudes, wherein regions of high Fourier amplitude in the combined Fourier amplitudes form a sinusoidal shaped Fourier amplitude band along an axis representing the plurality of different angles on the PSD;
    determine a maximum Fourier amplitude along the sinusoidal shaped Fourier amplitude band that is at highest Fourier frequencies, wherein a selected angle of the plurality of different angles is associated with the maximum Fourier amplitude; and
    use the selected angle of the plurality of different angles to generate a flow prediction.

15. The non-transitory computer readable medium as in claim 14 wherein the single beam light source is continuous.

16. The non-transitory computer readable medium as in claim 14 wherein the single beam light source is pulsing.

17. The non-transitory computer readable medium as in claim 14 wherein the single beam light source is a laser.

18. The non-transitory computer readable medium as in claim 14 wherein the single beam light source is a point source.

* * * * *